June 23, 1936.　　J. S. NEVITT　　2,045,047
FOLLOW BLOCK
Filed Feb. 18, 1935　　2 Sheets-Sheet 2

Inventor
James S. Nevitt
By Jack Ashley
Attorney

Patented June 23, 1936

2,045,047

UNITED STATES PATENT OFFICE 2,045,047

FOLLOW BLOCK

James S. Nevitt, Dallas, Tex., assignor to The Murray Company, Dallas, Tex., a corporation of Texas Application February 18, 1935, Serial No. 7,032

4 Claims. (Cl. 100—29)

This invention relates to new and useful improvements in follow blocks for cotton presses.

Figures 5, 6:
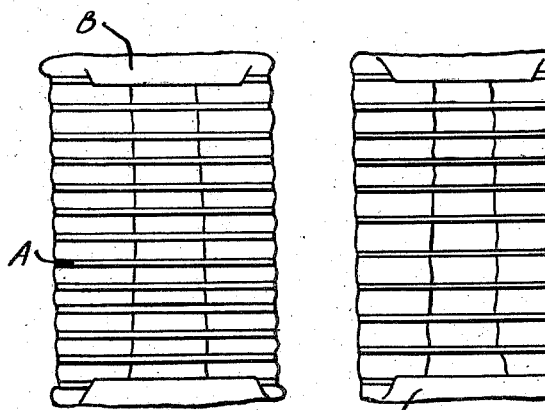

The usual practice in baling cotton has been to compress the cotton within a press box between a stationary platen and a movable platen. Both platens are constructed exactly alike with the bars of each platen in the same horizontal plane, whereby the cotton is compressed evenly throughout its entire length, except for the loss of compression at each end due to end clearance in the movable platen and the frictional end drag against the box casing. When the bands A are tightened around a bale the ends of the bale are displaced to a certain extent due to the greater expansion beyond the end ties thereby causing bulges at the ends of said bale. Thus, a bale formed with the usual platens, has its ends protruding beyond the sides of the bale, as shown in Figure 5. This irregularity is disadvantageous in storing or shipping the bales for it is obvious that it is impossible to stock the bales evenly. Also more space is necessary to store a given number of bales because of the wasted space between each bale caused by the irregularity of the surface of each bale.

One object of the invention is to provide an improved method of baling cotton or other fibrous material whereby the above disadvantages are overcome and the surface of each bale is symmetrical.

An important object of the invention is to provide an improved movable follow block, or platen having means at each end for increasing the compression of the ends of the bale, whereby when the bands are tightened about the bales the resultant displacement of the ends thereof forms a bale having a smooth and symmetrical surface.

Another object of the invention is to provide a movable press platen having the transversely extending bar at each end thereof projecting above the remaining bars therebetween, whereby the cloth used to cover a bale is forced inwardly toward the center of the bale during the pressing operation, thereby eliminating subsequent bulges of the cloth at the ends of said bale.

A construction designed to carry out the invention will be hereinafter described, together with other features of the invention.

Figure 1:
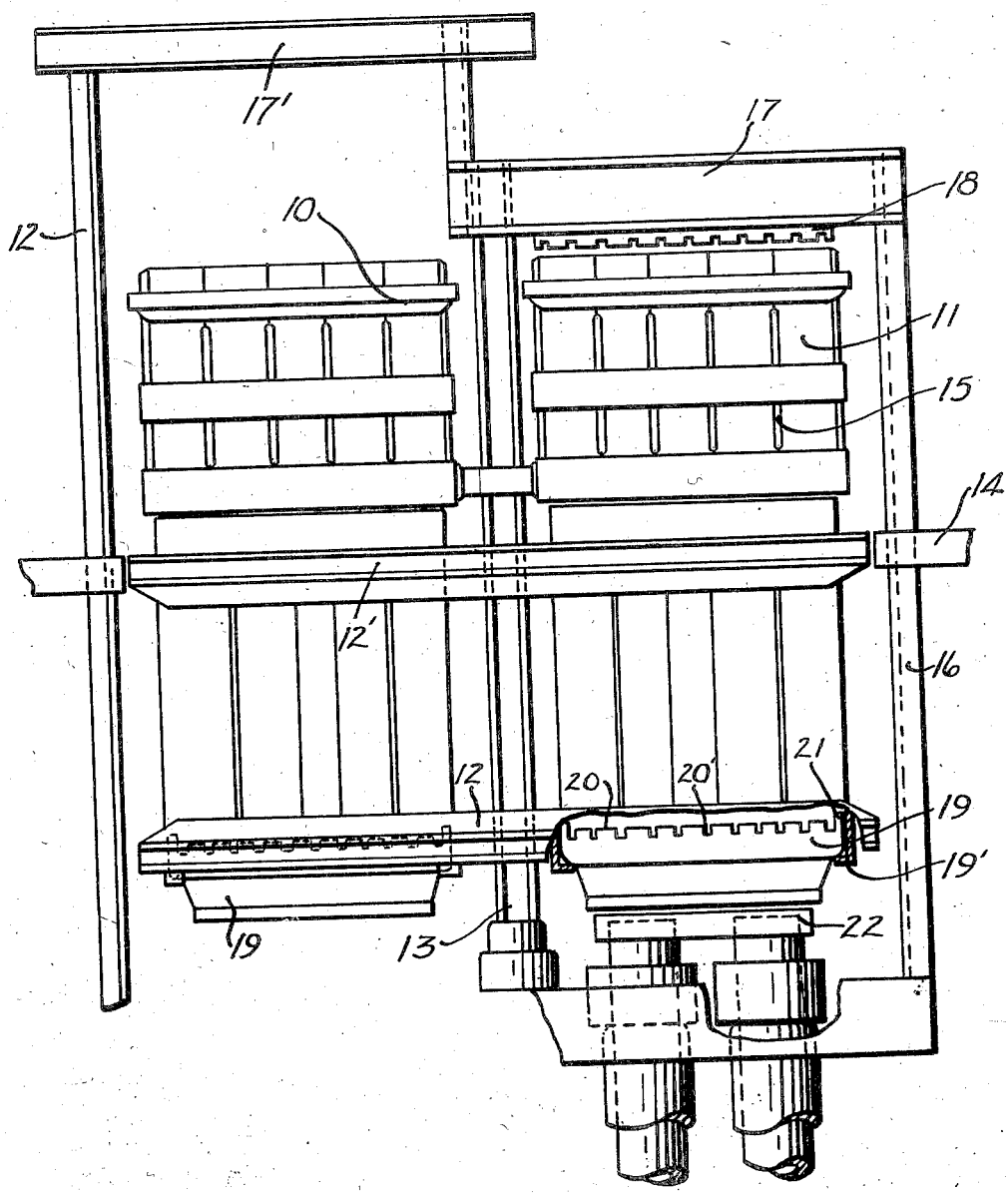
Figure 2:
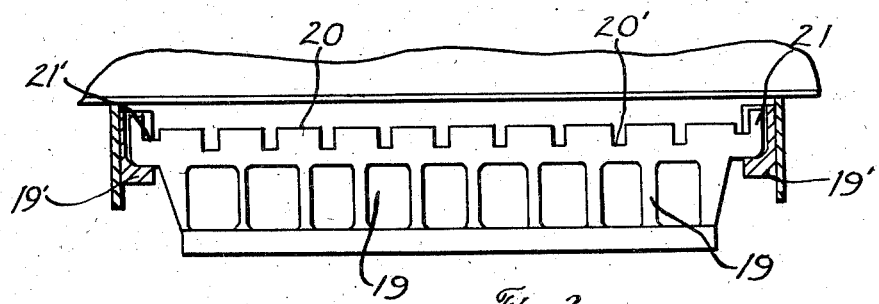
Figure 3:
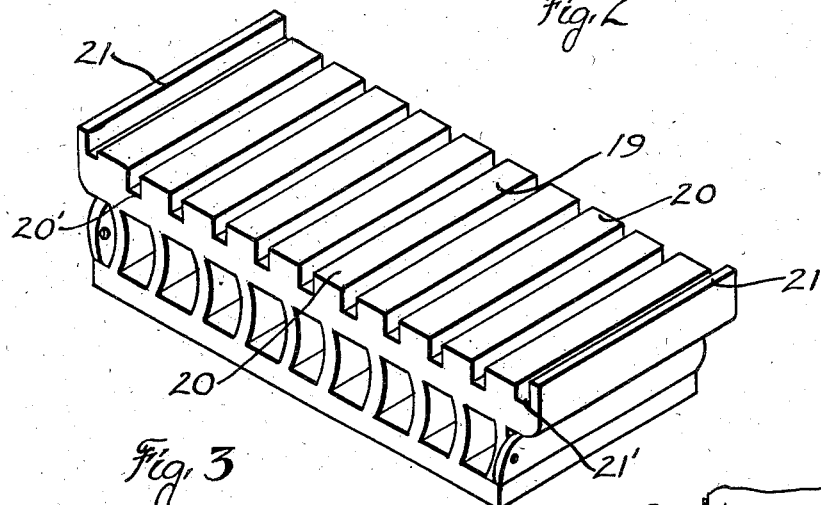
Figure 4:
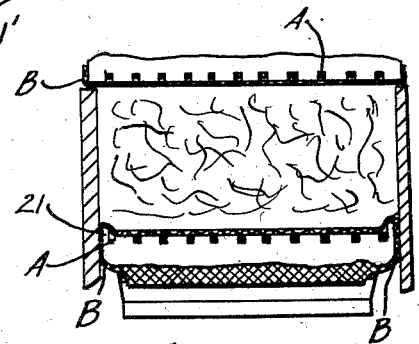

The invention will be more readily understood from a reading of the following specification and by reference to the accompanying drawings, in which an example of the invention is shown, and wherein:

Figure 1 is a view, partly in elevation and partly in section of a cotton press having a platen, constructed in accordance with the invention applied thereto, Figure 2 is an enlarged elevation of the platen, showing its supporting means in section, Figure 3 is a perspective view of the platen, Figure 4 is a partial sectional view, taken through the press and showing the platen in a raised position, Figure 5 is an elevation of a bale of cotton formed by the usual platen, and Figure 6 is an elevation of a bale of cotton formed by the improved platen.

In the drawings, the numeral 10 designates a double box-press of the usual construction. Each press box 11 is suitably secured in a rotatable frame 12 which is mounted to turn on a central vertical standard or column 13. The frame 12 includes the usual platform 12' which is in alinement with the press floor 14. Each box includes the usual side door 15.

A stationary frame supports the floor 14 and includes vertical side standards 16 and transverse channel bars 17 and 17'. The bar 17 has the usual stationary top platen 18 secured to its underside. By observing Figure 1, it will be seen that the boxes 11 are so arranged that when one of said boxes is in position for charging, that is, below the tramper (not shown), the other box is in direct vertical alinement with the platen 18. With this arrangement, the cotton in one box may be tamped, while the cotton in the other box, which has already been tamped is being baled, as will be hereinafer explained. All of the above described parts are usually in presses of this type and are therefore subject to variation.

Each press box 11 is provided with a movable follow block, or platen 19 which is suspended at its lower end in depending angular brackets 19'. This movable block is of the same shape as the interior of the box 11 and may be constructed of metal, wood, or other suitable material. The block is provided with a plurality of transverse bars 20 on its upper side. The upper face of the bars 20 are all in the same horizontal plane. A bar 21 is located at each end of the block, and these bars are parallel to the intermediate bars 20. The bars 21 are shown comparatively narrow in width but may be of any desired width. The end bars 21 are the important feature of the invention and it is pointed out that they extend higher vertically from the block than the bars 20. That is, the upper face of the end bars is above, or higher in a horizontal plane than the upper face of the bars 20. With the parts in the position shown in Figure 1, the box 11 on the right hand side of the drawings, is in alinement with the upper stationary platen 18. The follow block, or platen 19, suspended therefrom is directly above a ram plunger 22 which is arranged to move vertically to engage its underside. It is obvious that as the plunger moves upwardly, the block 19 is moved upwardly in the box 11 to compress the cotton therein between said block and the stationary platen 18.

In operation, the bands A (Figure 4) which bind the bale of cotton are first inserted in the grooves 20' formed in the follow block between the intermediate bars 20 and also within the grooves 21' formed between the outermost bar 20 and each end bar 21. A piece of burlap, or similar cloth B which is used to cover the bale is then stretched over the stationary platen 18 and the movable block 19, as shown in Figure 4. The plunger 22 is then operated to move vertically and its engagement with the underside of the block forces said block upwardly in the box 11.

It is obvious that upward movement of the block will compress the cotton within the box into a bale. Since the end bars 21 of the block are higher than the bars 20, the ends of the bale will be compressed more than the rest of said bale. This increased compression causes the completed bale to be reduced at its ends. Thus, when the bands A are tightened around the bale, the expansion or displacement of the ends, due to said tightened bands, will cause the compressed ends of the bale to move outwardly a limited distance, whereby after the bale is complete, bands and all, the surface of the bale will be smooth and symmetrical, and in perfect alinement throughout its length (Figure 6).

With the usual type platens the ends of the bale bulge outwardly thereby causing the surface of the bale to be irregular.

This objection has been overcome by the provision of the higher end bars 21 which serve to compress the ends of the bale to a further extent than the remainder thereof. Thus, the subsequent tightening of the bands does not cause an irregularity but merely displaces said ends so that they are in alinement with the rest of the surface of said bale. It is pointed out that the particular height of the bars 21 is subject to variation and by making them higher than shown the subsequent displacement of the ends would be insufficient to aline said ends with the remaining surface of the bale. In such case, the ends of the bale would be reduced, which would still eliminate the unevenness in stocking the bales.

During the compressing operation, the bars 21 not only serve to reduce the ends of the bale but they tend to move the ends of the burlap B, or other cloth, hanging over said bars, inwardly toward the center of the bale because in compressing the ends of the bale, the cotton is displaced inwardly toward the center of said bale. This inward displacement of the cotton tends to move the cloth inwardly therewith, whereby bagginess of the cloth at the end corners of the bale is eliminated. This bagginess of cloth at the corners is present in the bales now formed with the present platens, and provides a pocket into which the cotton may be displaced when pressure is applied to the bands A.

It is pointed out that although the follower block has been shown and described as used with a double-box cotton press, the invention may be readily applied to any type of press for fibrous materials. Further, the block need not be movable vertically as described, for it is obvious that it would operate efficiently in a horizontally operating press. Also the covering or bagging B is not essential to the operation of the block, as the fibrous material may be compressed without the use of said covering.

What I claim and desire to secure by Letters Patent is:

1. A follow block for a bale press comprising, a frame consisting of parallel spaced bars the bale contacting surface of which lie in the same plane, and end bars parallel to the spaced bars and projecting beyond the outer bale contacting surface of said spaced bars, the inner vertical surface of the end bars being perpendicular to the bale-contacting surface of the intermediate bars.

2. A follow block for a bale press comprising, a frame consisting of parallel spaced bars having their outer bale contacting surfaces lying in the same plane, and end bars rectangular in cross section extending parallel to the spaced bars, said end bars projecting beyond the plane of the bale contacting surfaces of said intermediate spaced bars, whereby when pressure is applied to a bale contacting the block, the intermediate spaced bars will compress the intermediate portion of the bale evenly while the projecting end bars will compress the ends of the bale to a greater extent.

3. A follow block for a bale press comprising, a frame consisting of a plurality of parallel spaced bars rectangular in cross-section, the outer bale contacting surfaces of the bars being in the same plane, and parallel end bars one at each end of the intermediate spaced bars, said end bars being rectangular in cross-section and projecting beyond the plane of the bale contacting surfaces of the intermediate bars, the inner surface of said end bars being disposed at right angles to the plane of said bale contacting surfaces, whereby when pressure is applied to a bale contacting the block, these inner surfaces of the end bars as well as the projected outer surface of said end bars engage the ends of the bale to compress the ends of said bale to a greater extent than that portion of the bale contacted by the intermediate bars.

4. A follow block for a bale press including, a block member for the press box having a bale contacting surface of spaced rigid parallel bars having their tops substantially flat and lying in substantially the same horizontal plane throughout their entire lengths, and rigid end bars substantially parallel to the said spaced bars and spaced therefrom, the top surfaces of the end bars projecting above the plane of the spaced bars and each top surface extending in substantially the same horizontal plane throughout its entire length, the said top surfaces of the end bars each having sufficient width to provide an adequate pressing area to compress the abutting ends of the bale.

JAMES S. NEVITT.